(No Model.)
I. ROTHHAN & F. SCHMIDT.
HORSE COLLAR.
No. 310,618. Patented Jan. 13, 1885.
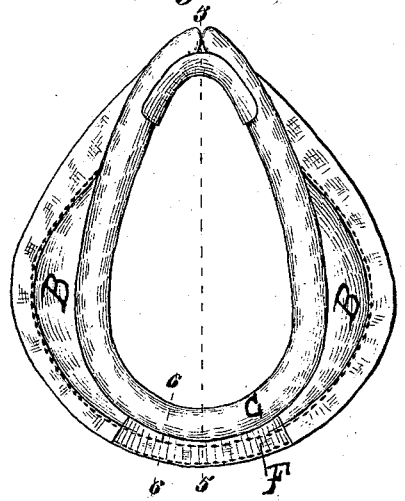
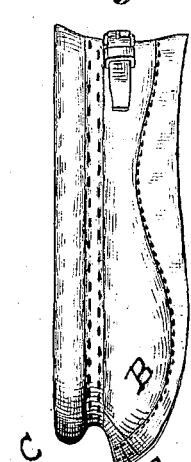
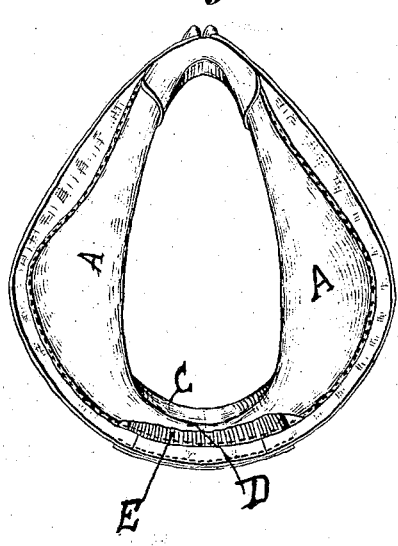
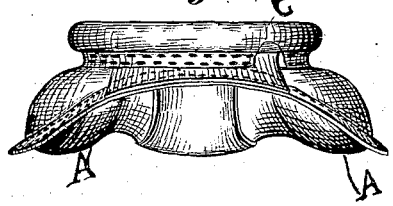
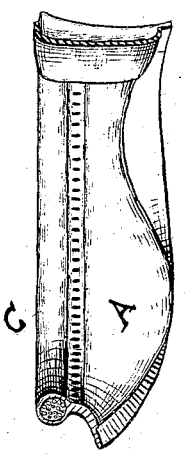
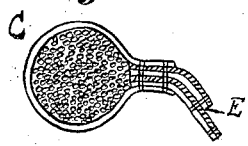
Attest:
J. L. Hornsby
Fernando Sauter
Inventors
Isaac Rothhan
Frederick Schmidt,
by Paul Bakewell,
their attorney

UNITED STATES PATENT OFFICE.

ISAAC ROTHHAN AND FREDERICK SCHMIDT, OF ST. LOUIS, MISSOURI.

HORSE-COLLAR.

SPECIFICATION forming part of Letters Patent No. 310,618, dated January 13, 1885.

Application filed November 3, 1884. (No model.)

*To all whom it may concern:*

Be it known that we, ISAAC ROTHHAN and FREDERICK SCHMIDT, both of the city of St. Louis, State of Missouri, have made a certain new and useful Improvement in Horse-Collars, of which the following is a full, clear, and exact description, reference being had to the annexed drawings, in which—

Figure 1 is a front elevation of my improved collar; Fig. 2, a side elevation of same; Fig. 3, a rear elevation of same; Fig. 4, an end elevation of same; Fig. 5, a vertical section on line 5 5, Fig. 1; Fig. 6, a vertical section on line 6 6 of Fig. 1; Fig. 7, a diagram showing manner of stitching shoulder-pad and rim to roll or neck of collar.

The objects of our invention are to secure the several parts of a collar firmly together and in a durable manner, and with a view to preserving the collar in the desirable shape without any special piece or pieces of leather in or about the roll of the collar for a stiffening piece or pieces, and to make a collar without any padding at its throat or lower inside extremity, and to so construct a collar at that same point as that the collar there will be held firmly together, and yet allowing a sufficient spring in the collar at that point to allow of the collar being opened and springing back in its proper position.

In the drawings, A designates what we term the "belly" of our collar; B, the back or shoulder of our collar; C, the rim; D, the throat or inside lower part of our collar; E, leather spring portion; F, outside strip or band.

Figs. 2 and 4 show our peculiar thong-stitch connecting rim, back, and belly of our collar together by one leather thong, forming a double stitch on the outside of that part of the collar into which the hame is inserted, and which we call the "roll" or "collar." Fig. 5 shows our peculiar thong, forming single cross-stitch on the inside of the said roll. Fig. 7 shows the peculiar formation of the single leather thread or thong when it forms the peculiar double stitch on the outside of roll and single stitch on inside of roll, which we will hereinafter describe. Fig. 6 shows the peculiar conformation and construction of our throat-piece or lower inside part of our collar.

Prior to our invention of this improvement in collars, collars had been made by connecting belly, back, and rim by two rows of stitching, one of thread (not of leather) and the other of thong or leather thread, and frequently by inserting between the different pieces of leather in the neck or roll of collar a strip of leather or strip of any hard substance, in order to preserve the collar in its peculiar desirable shape in conformity with a horse's neck, and by having the belly-pieces either padded at their lower ends, where they meet, which results in making the collar too stiff and unyielding at that end, or by having the belly-pieces unpadded at their lower ends and very narrow and thin at the lower ends, where they meet, without any provision for holding these belly-pieces together at top of collar by means of a continuous springing force to that end, all of which makes the collar weak at the point where the two belly-pieces meet, and allows too much lateral play to these belly-pieces, and tends to throw the collar out of shape.

These disadvantages in the aforesaid methods of constructing horse-collars are of considerable disadvantage in the wear and practical use of the collars, and the disadvantage of having a special stiffening-piece in the neck or roll of the collar is that it makes the collar too rigid for the uses and purposes to which it is put, and the disadvantage of having two rows of stitching—one of thread—connecting the several parts, as aforesaid, is that from the friction of the hames and the influences of the weather the thread will wear and rot.

Our invention consists in connecting belly, rim, and back of collar by one leather thong, and so stitching said parts together by said thong as to bring those parts so snugly and closely together as to form by means of those parts—belly, back, rim, and the leather thong to thread them by—such a strong connection at the point of the roll or neck of collar as to give the collar the requisite strength and retention of shape. This we do by stitching said parts by said single piece of thong, and making a cross-stitch with the thong inside of roll or neck of collar, as shown in Fig. 5, and at o o o, Fig. 7, and then turning the stitch of this single thong on the outside of the roll or neck (the place for insertion of hame) into a longitudinal stitch, as shown at Figs. 2 and 4, and as shown at x x x of Fig. 7, and jumping this longitudinal stitch alternately from one side to the other, (on outside of roll or neck,) as also shown in said Figs. 2 and 4 and at points x x x, Fig. 7. The resultant advantage in this is that no thread is used to make this stitching, but only a single piece of leather thong, and thereby a lasting and strong stitch is made, and that from the peculiarities of this stitching the result is that the belly, back, and rim of collar are not only held firmly together, and that there is no thread in this connection to wear from friction of hame or influences of weather, but that the connection of said parts so made answers all the purposes of a special stiffening-band, and allows of just sufficient elasticity and form-retaining requirements.

Our invention further consists in doing away with any stuffing in lower ends of belly-pieces, about the point of their connection with each other, but by inserting underneath the lower ends of those belly-pieces, at D, Fig. 3, of drawings, a re-enforcing rawhide or leather strip, E, which also acts as a spring to re-enforce and keep belly-pieces together. And, furthermore, we preferably add an outside strip, F, (see Figs. 1, 2, and 4 of drawings,) to further strengthen collar at the lower part.

We claim—

1. As an improved article of manufacture, a horse-collar the rim, back, and belly parts of which are connected together at the roll or neck of collar by a single leather thong stitched through the said parts, so as to form a single cross-stitch on inside of roll or neck and a double line of longitudinal stitches on outside of roll or neck, substantially as described, and for the purposes set forth.

2. As an improved article of manufacture, a horse-collar the rim, back, and belly parts of which are connected together at the roll or neck of collar by a single leather thong stitched through the said parts, so as to form a single cross-stitch on inside of roll or neck and a double line of longitudinal stitches on outside of roll or neck, as described, belly-pieces A A, unstuffed at their lower ends, and a re-enforcing or spring piece, E, of leather or rawhide, inserted underneath the lower end portions of said belly-pieces, combined and arranged substantially as described, and for the purposes specified.

3. In a horse-collar, the combination of the rim, neck, and belly parts, connected together at the roll or neck of collar by a single leather thong, stitched through the said parts, so as to form a single cross-stitch on inside of roll or neck and a double line of longitudinal stitches on outside of roll or neck, as described, belly parts A A, unstuffed at their lower ends, a re-enforcing or spring piece, E, of leather or rawhide, inserted underneath the unstuffed ends of belly parts A A, and an outside strengthening-strip, F, substantially as described, and for the purposes set forth.

In testimony whereof we have affixed our signatures, in presence of two witnesses, this 22d day of October, 1884.

ISAAC ROTHHAN.
FREDERICK SCHMIDT.

Witnesses:
PAUL BAKEWELL,
FERNANDO SAUTER.